(12) United States Patent
Dooley

(10) Patent No.: US 7,446,156 B2
(45) Date of Patent: Nov. 4, 2008

(54) SWIRLING FLUIDIZED-BED REACTORS FOR OLEFIN POLYMERIZATION

(75) Inventor: Kenneth Alan Dooley, Longview, TX (US)

(73) Assignee: Westlake Longview Corporation, Houston, TX (US)

( * ) Notice: Subject to any disclaimer, the term of this patent is extended or adjusted under 35 U.S.C. 154(b) by 0 days.

(21) Appl. No.: 11/585,050

(22) Filed: Oct. 23, 2006

(65) Prior Publication Data

US 2007/0270557 A1 Nov. 22, 2007

Related U.S. Application Data

(60) Provisional application No. 60/800,826, filed on May 16, 2006.

(51) Int. Cl.
   *C08F 2/34* (2006.01)
   *C08F 2/00* (2006.01)
   *B01J 8/44* (2006.01)

(52) U.S. Cl. .............................. 526/88; 526/64; 526/901

(58) Field of Classification Search ................... 526/64, 526/88, 901
   See application file for complete search history.

(56) References Cited

U.S. PATENT DOCUMENTS 4,543,399 A * 9/1985 Jenkins et al. ................. 526/70
4,877,587 A * 10/1989 Rhee et al. ................... 422/135
6,001,938 A * 12/1999 Chinh et al. ................... 526/68
6,113,862 A 9/2000 Jorgensen et al.
6,723,291 B1 * 4/2004 Wu ............................. 422/143
6,958,376 B2 * 10/2005 Muldowney .................. 526/90
2002/0056312 A1 * 5/2002 Tamura et al. ............. 73/61.71
2006/0002829 A1 * 1/2006 Zimmer ..................... 422/147

FOREIGN PATENT DOCUMENTS

| EP | 1 041 087 A2 | 10/2000 |
| EP | 1 041 087 A3 | 10/2000 |
| EP | 1 106 984 A2 | 6/2001 |
| EP | 1 106 984 A3 | 6/2001 |
| WO | WO 95/01831 | 1/1995 |
| WO | WO 97/18888 A1 | 5/1997 |

OTHER PUBLICATIONS

C. Chyang et al., "A Study in the Swirling Fluidizing Pattern," *J. Chem. Eng. Japan*, (2002), pp. 503-512, vol. 35, No. 6.

* cited by examiner

*Primary Examiner*—Fred M Teskin
(74) *Attorney, Agent, or Firm*—Phan Law Group PLLC

(57) ABSTRACT

A method for polymerizing olefins in a fluidized-bed reactor is provided. The method involves introducing a fluid into the fluidized-bed reactor at an angle and amount sufficient to induce one or more swirls in the fluidized bed in the reactor.

4 Claims, No Drawings

SWIRLING FLUIDIZED-BED REACTORS FOR OLEFIN POLYMERIZATION

CROSS-REFERENCE TO RELATED APPLICATION

This application claims the benefit of the filing date of U.S. Provisional Patent Appl. No. 60/800,826, filed on May 16, 2006.

FIELD OF THE INVENTION

The invention generally relates to a method for polymerizing olefins in a fluidized-bed reactor. The fluidized bed has one or more induced swirls to prevent or inhibit fouling in the reactor.

BACKGROUND OF THE INVENTION

In olefin polymerization fluidized-bed reactors, fluidization is achieved by means of upward flowing gas. A grid at the bottom of the reactor is used to uniformly distribute the fluidization gas across the reactor cross-section and to prevent solids from entering the gas supply plenum. A problem plaguing the industry is the build-up of sheets of powder on the wall of the reactor. When these sheets fall from the reactor wall, they have the potential of blocking significant portions of the gas distribution grid and, as a result, disrupt the reactor flow or even plug the reactor.

Thus, there is a need in the art for a means of altering the hydrodynamics of the olefin polymerization fluidized bed to reduce the sheeting potential and improve mixing.

SUMMARY OF THE INVENTION

Briefly, the present invention provides a method for polymerizing olefins in a fluidized-bed reactor. The method includes the step of introducing a fluid into the fluidized-bed reactor at an angle and amount sufficient to induce one or more swirls in the fluidized bed in the reactor.

DETAILED DESCRIPTION OF THE INVENTION

According to the invention, sheeting in olefin polymerization fluidized-bed reactors can be decreased or prevented by introducing a fluid into the fluidized-bed reactor at an angle and amount sufficient to induce one or more swirls in the fluidized bed in the reactor. Rotation in the fluidized bed will increase the tangential velocity of the solids at the reactor wall, thereby increasing the shear forces near the wall and reducing the incidence of reactor wall sheeting.

Another benefit of imparting rotation in the fluidized bed will be the reduction of the amount of particles elutriated from the top of the fluidized bed. In polymerization systems, particles leaving the top of the fluidized bed can lead to fouling of the piping systems and equipment used to cool and return the fluidizing gas to the reactor inlet.

Preferably, the one or more swirls are induced without the aid of mechanical devices such as a stirrer or rotating blades or paddles. Such devices can complicate the bed design and limit the bed operation.

The method of the invention can be used to polymerize a variety of olefins using catalysts known in the art such as Ziegler-Natta and metallocene. Suitable polymerization monomers include olefins such as ethylene, propylene, butene, pentene, hexene, etc. and combinations thereof.

The manner in which the fluid is introduced into the fluidized bed to induce one or more swirls is not particularly limiting. For example, the fluid can be introduced through a distributor plate at the bottom of the reactor. The distributor plate can have perforations which introduce the fluid at an angle other than vertical. Alternatively, the distributor plate can have deflectors or nozzles which introduce the fluid at an angle other than vertical to induce the swirl(s).

The arrangement of the perforations, deflectors, and/or nozzles is not particularly limiting, so long as they are effective to induce one or more swirls in the fluidized bed. For example, the perforations, deflectors, and/or nozzles can be arranged in one or more concentric circles, with the same discharge angle and direction. Alternatively, the perforations, deflectors, and/or nozzles can be arranged in more than one non-concentric circle to induce multiple swirls within the bed.

The fluid can also be introduced through one or more injectors or nozzles located in or along the fluidized bed to induce the swirl(s).

In one embodiment, the entire fluidized bed swirls in one direction.

The angle and amount of the fluid introduced into the fluidized bed to induce one or more swirl(s) can vary, depending on the particular polymerization system employed as well as the angle and amount of the fluid introduced. Generally, the fluid may be introduced into the reactor at an angle from 90° relative to vertical up to almost vertical. The amount of the fluid introduced at an angle to induce the one or more swirls can vary. Such amounts can be determined by routine experimentation by one skilled in the art.

The fluid used to induce the one or more swirls can be a gas or liquid. Typically, the fluid would be a gas, and the gas can be one or more of the gases usually used in olefin polymerization such as nitrogen, hydrogen, olefin(s), and alkane(s).

In another embodiment, in addition to inducing one or more swirls, the fluidization velocity inside the reactor can also be changed periodically to further inhibit or reduce sheeting. Changing the fluidization velocity to prevent or inhibit fouling in an olefin polymerization fluidized-bed reactor is described in a copending U.S. Patent Application claiming priority to provisional U.S. Patent Application No. 60/800,826, filed May 16, 2006 and entitled "Pulsing Olefin Polymerization Fluidized-Bed Reactors; the content of which is hereby incorporated by reference.

The invention has been described in detail with particular reference to preferred embodiments thereof, but it will be understood that variations and modifications can be effected within the spirit and scope of the invention.

I claim:

1. A method for polymerizing olefins in a fluidized-bed reactor, comprising:
    introducing a fluid into the fluidized-bed reactor at an angle and amount sufficient to induce one or more swirls in the fluidized bed in the reactor,
    wherein the fluid is introduced through a distributor plate at the bottom of the reactor;
    wherein the distributor plate comprises perforations, deflectors, or nozzles which introduce the fluid at an angle other than vertical; and
    wherein the perforations deflectors, or nozzles are arranged in more than one non-concentric circle to induce multiple swirls within the bed.

2. The method according to claim 1, wherein the fluid comprises a gas.

3. The method according to claim 2, wherein the gas comprises olefins.

4. The method according to claim 1, wherein the fluid comprises a liquid.

* * * * *